Sept. 6, 1932.　　　　　L. D. SOUBIER　　　　　1,875,827
MACHINE FOR FORMING HOLLOW GLASSWARE
Filed June 13, 1928　　　8 Sheets-Sheet 5
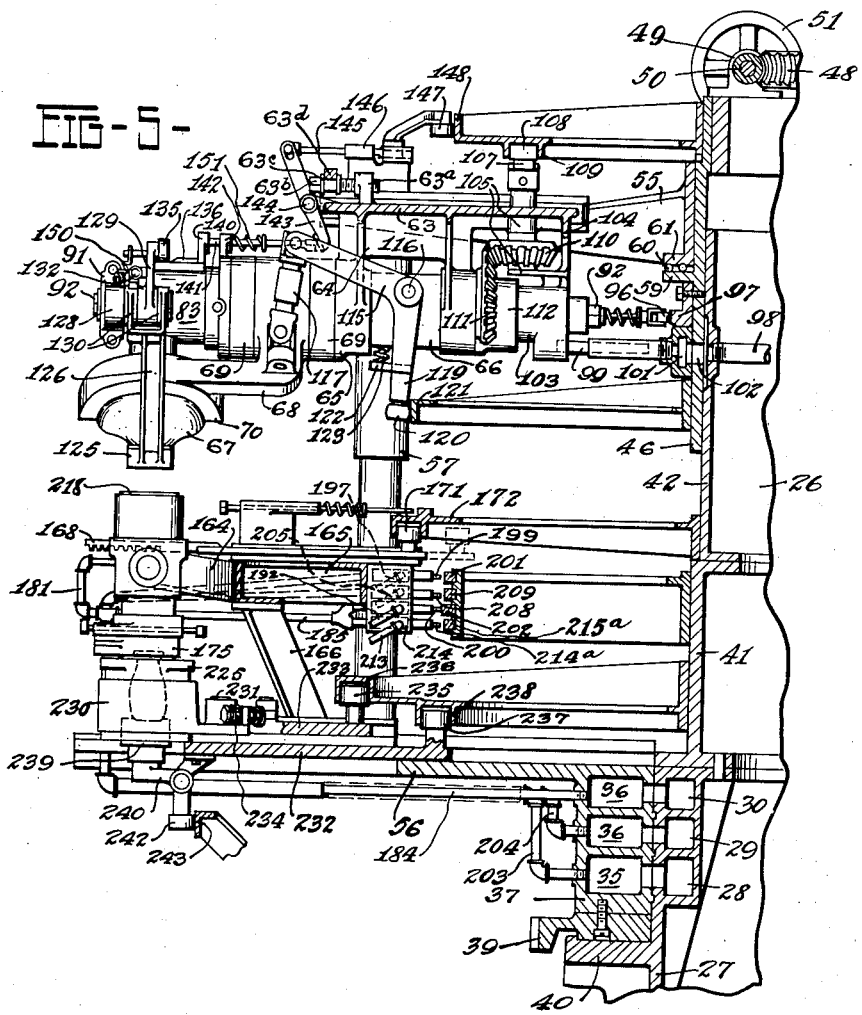
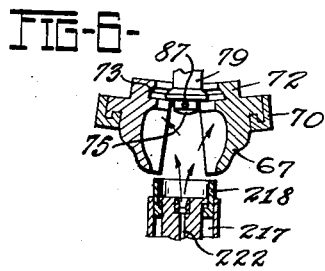
Inventor
Leonard D. Soubier
By J. F. Rule
Attorney

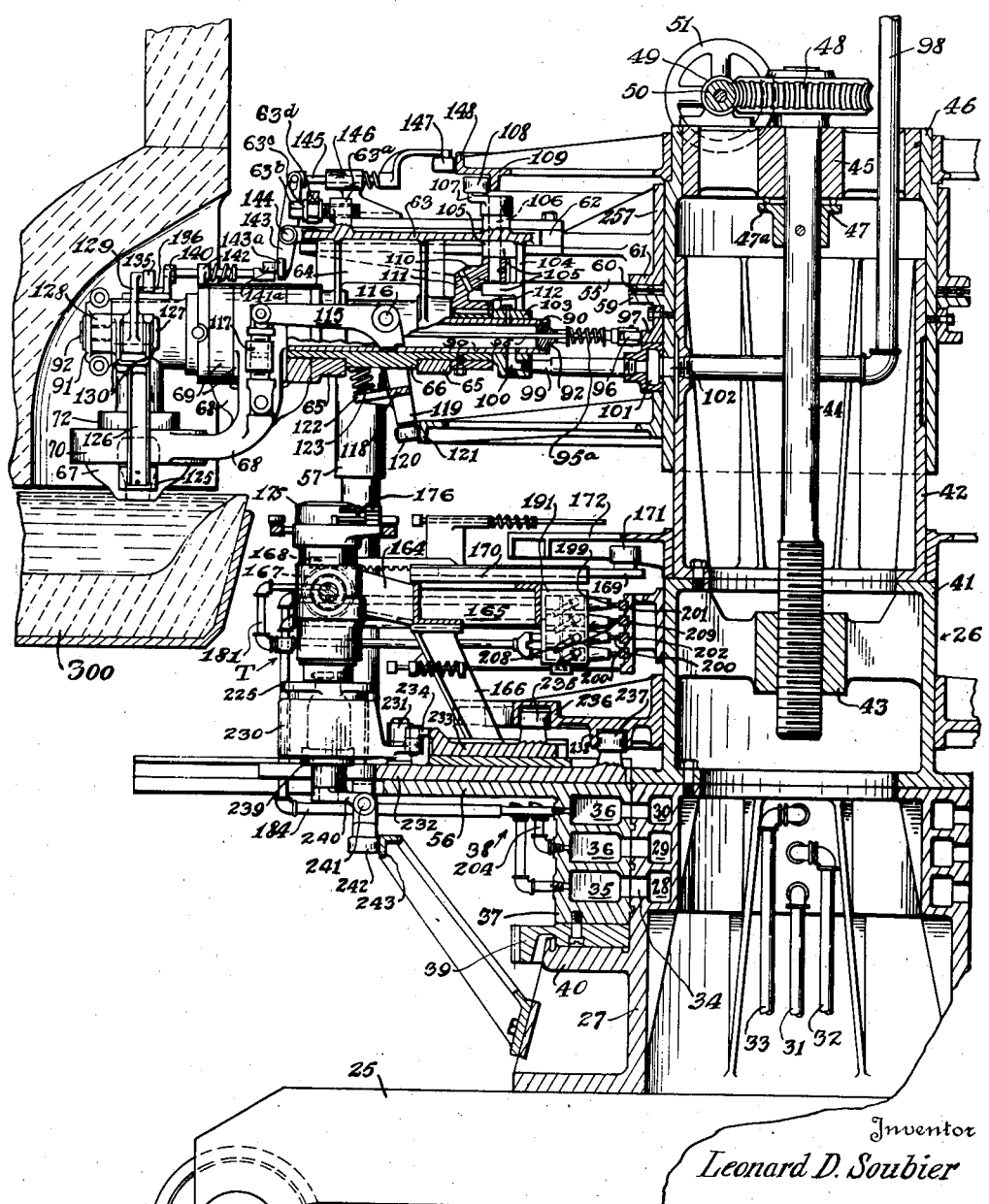

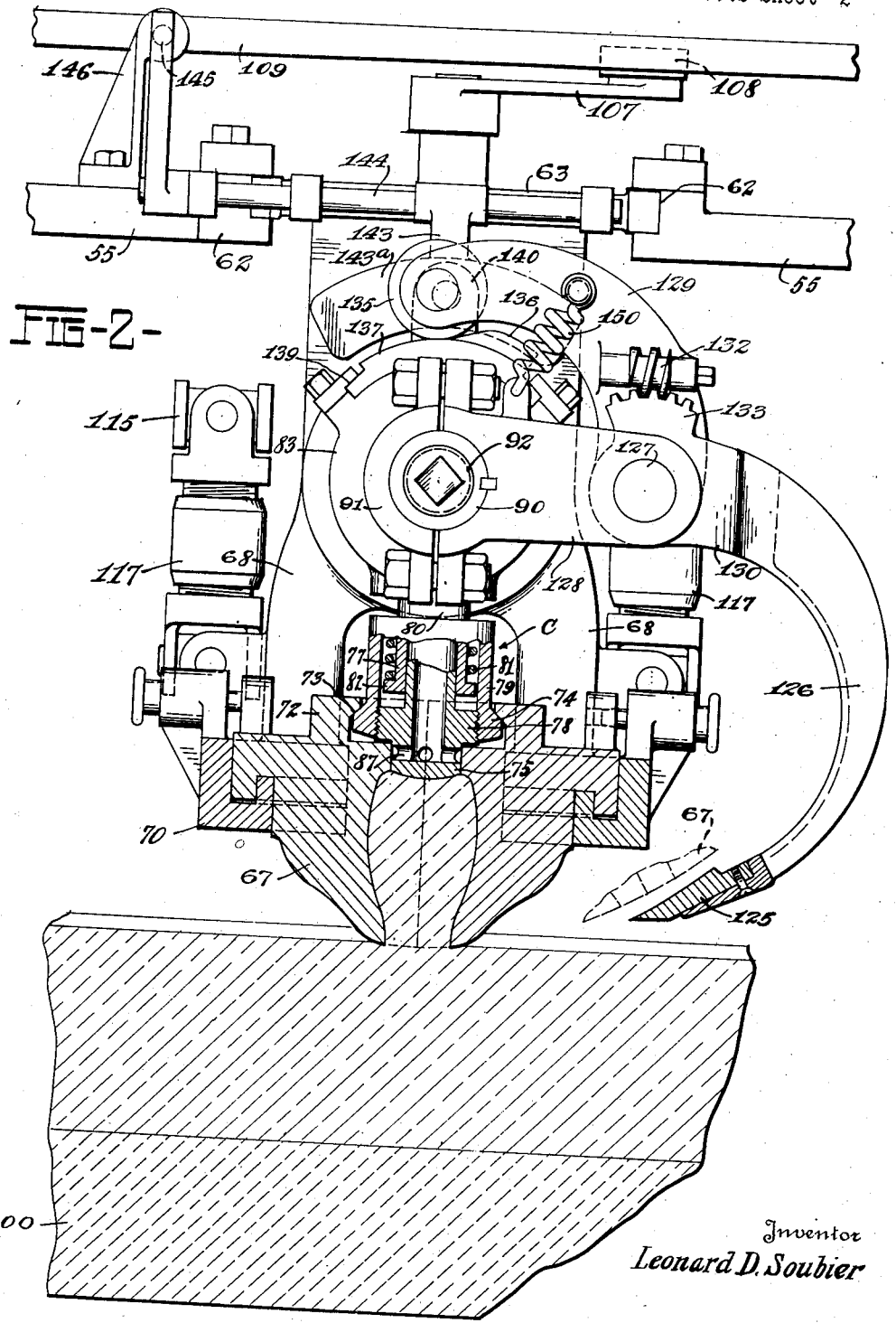

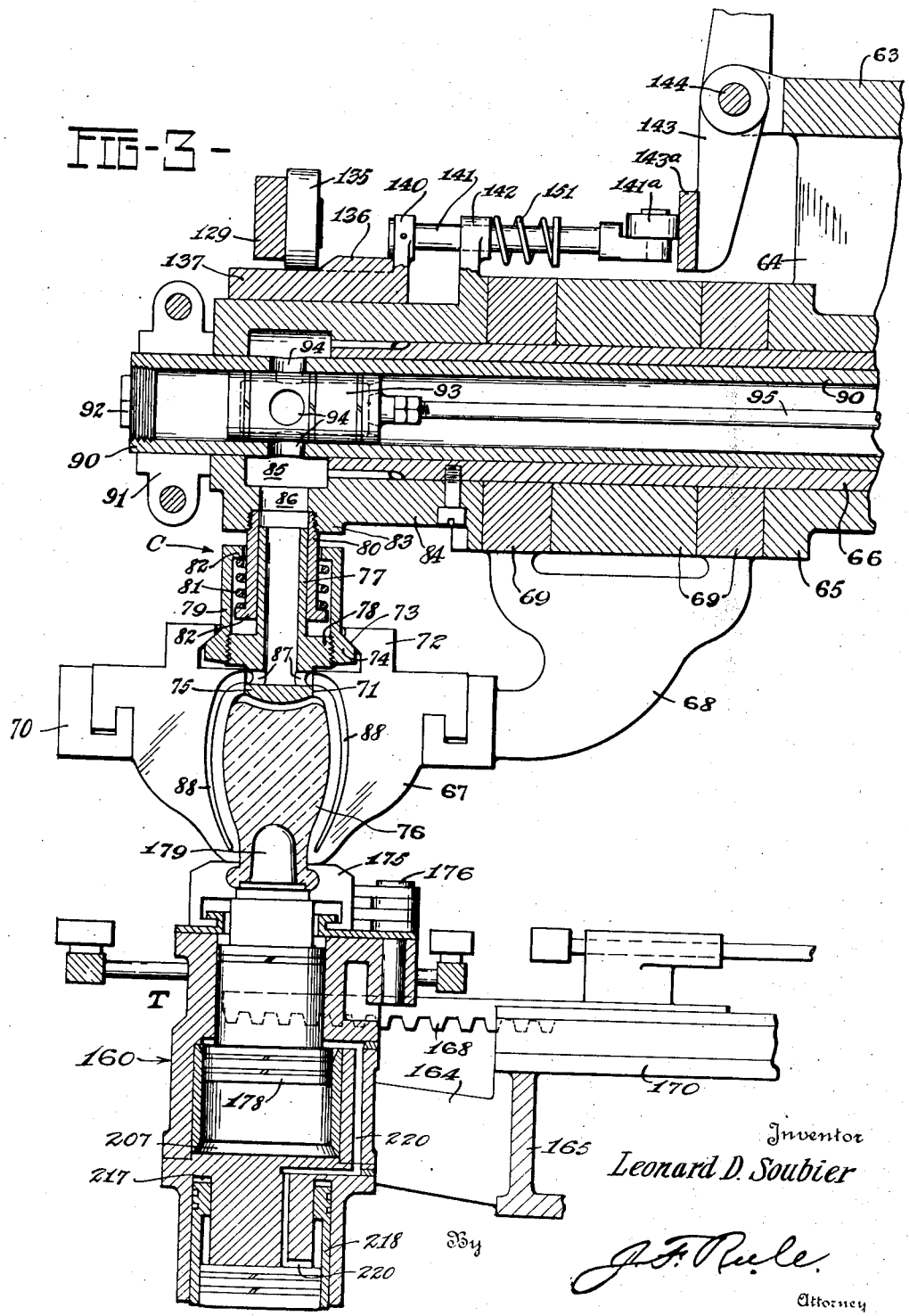

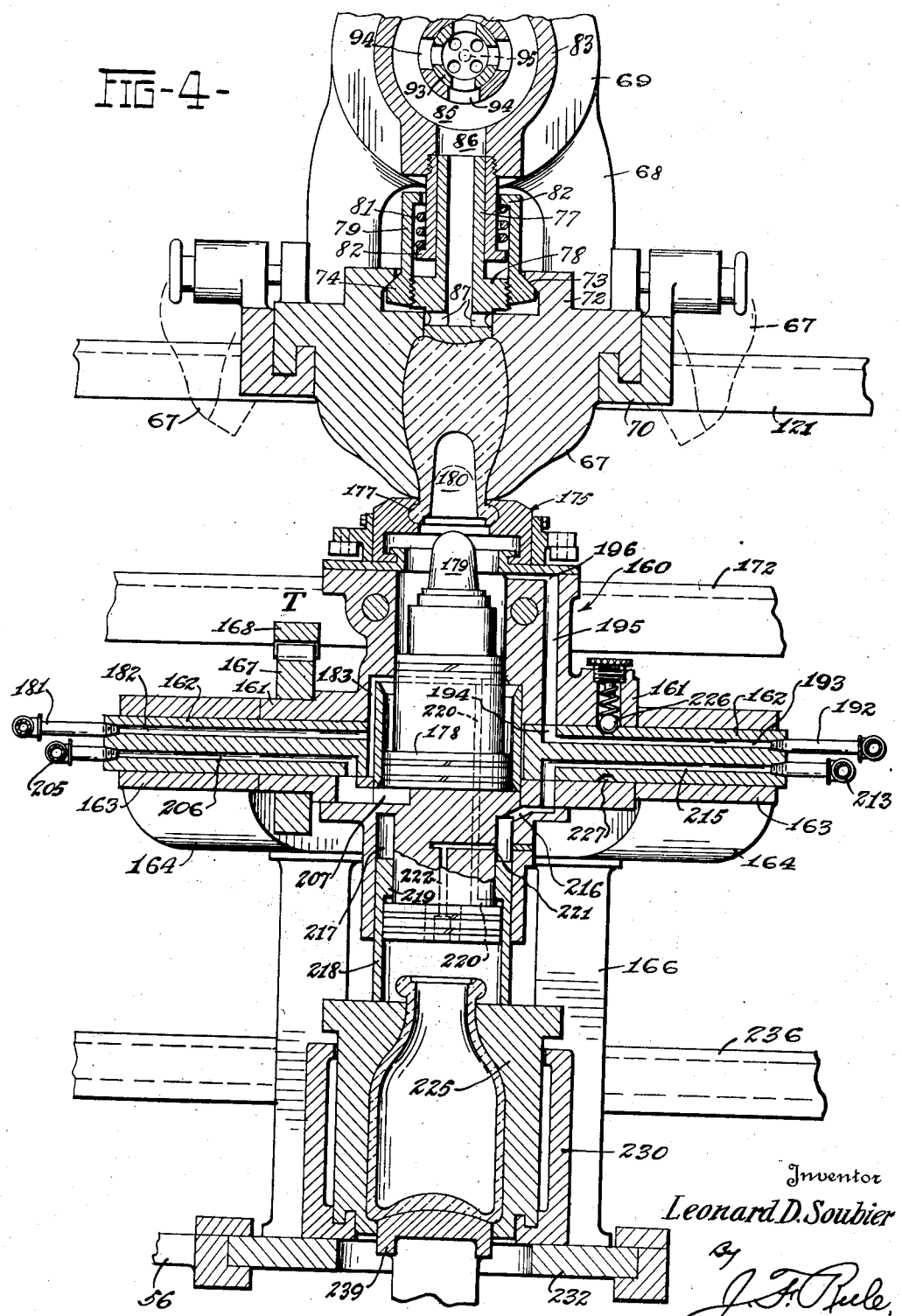

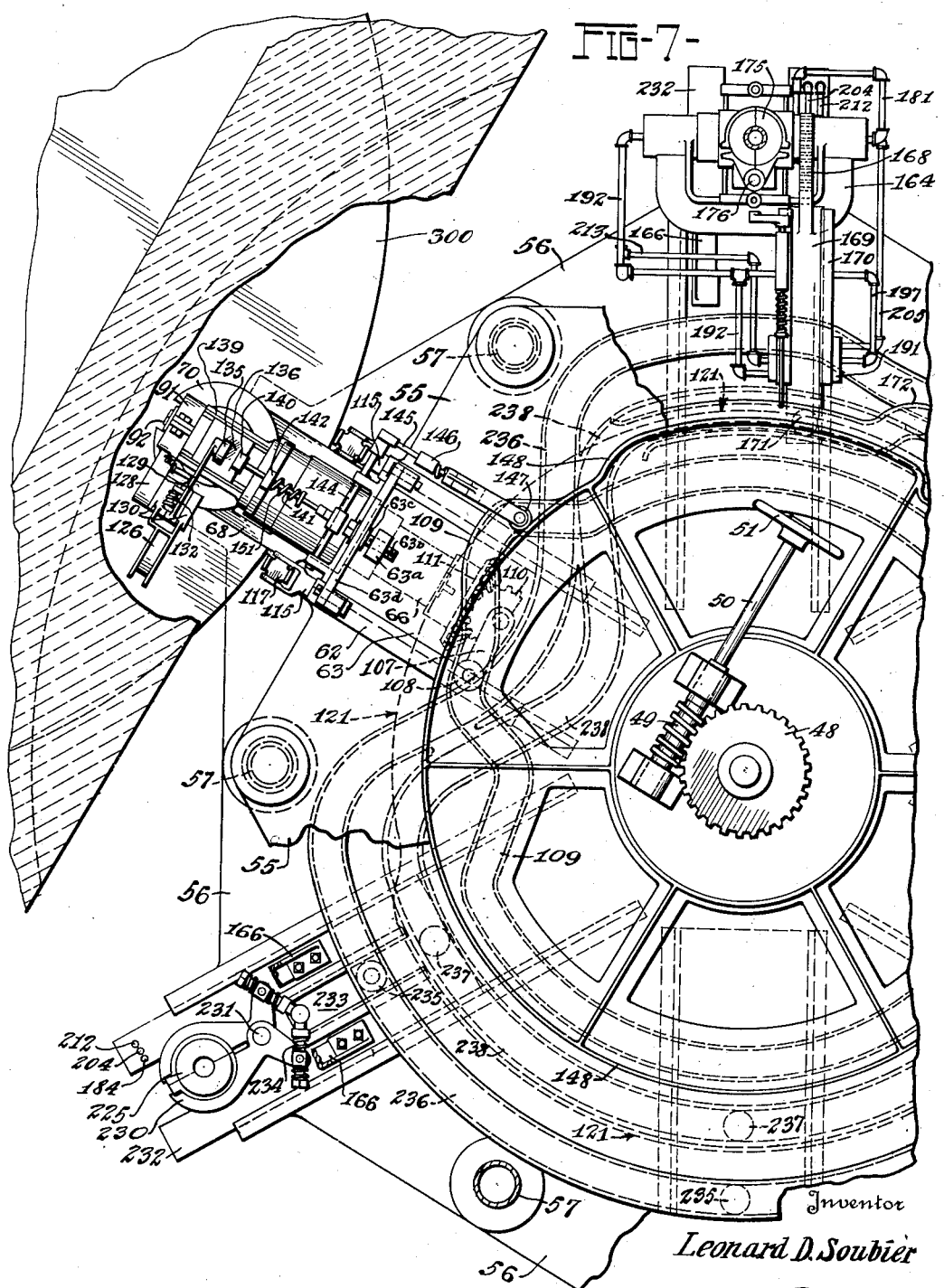

Sept. 6, 1932.     L. D. SOUBIER     1,875,827
MACHINE FOR FORMING HOLLOW GLASSWARE
Filed June 13, 1928     8 Sheets-Sheet 7
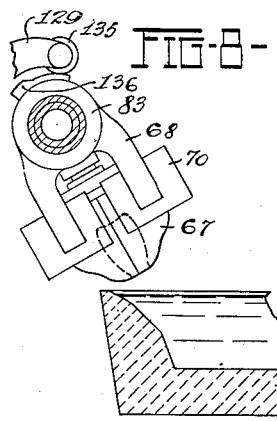
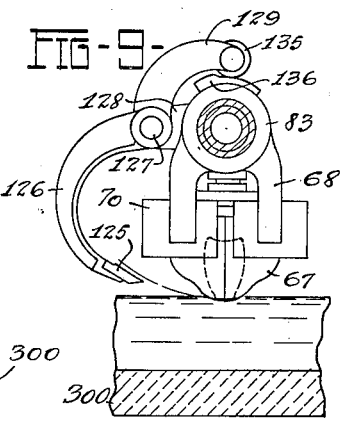
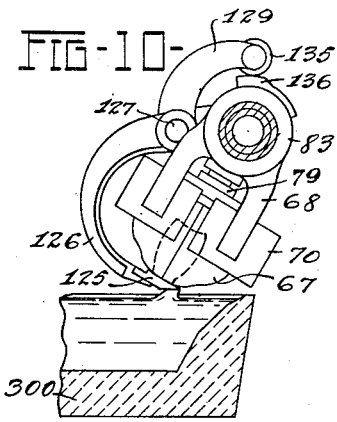
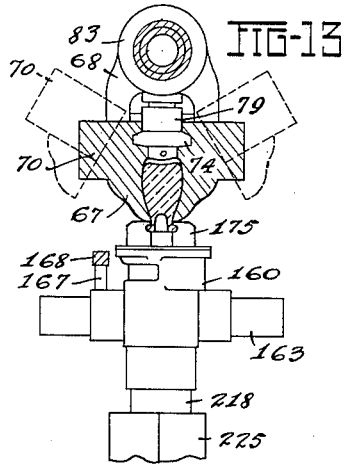
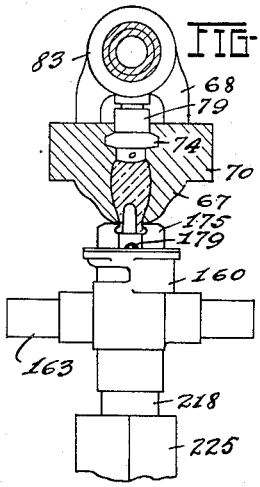
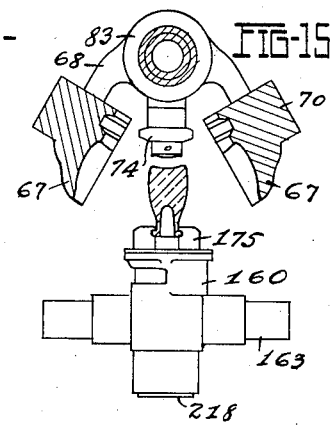
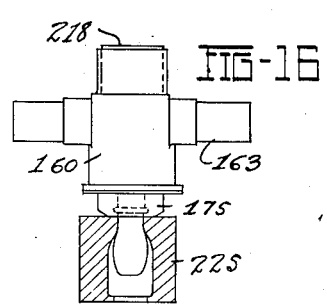
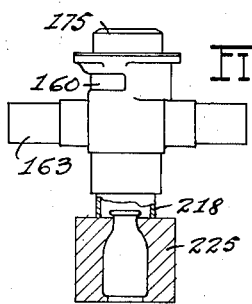
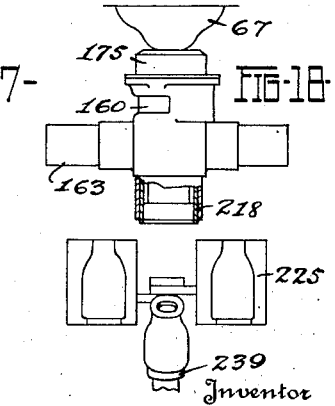
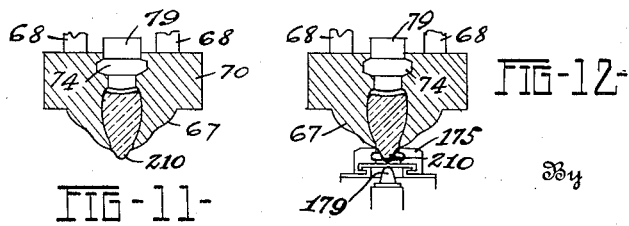
Inventor
Leonard D. Soubier
By J. F. Rule
Attorney

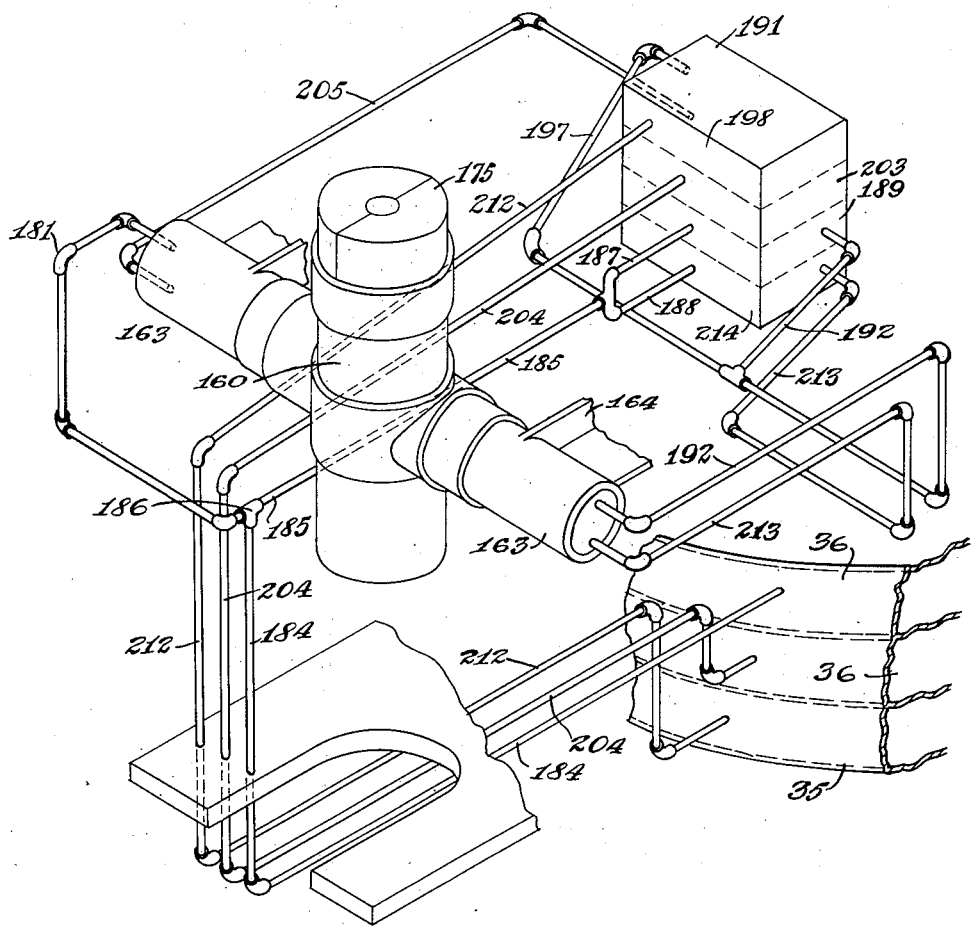
FIG-19-

Patented Sept. 6, 1932

1,875,827

UNITED STATES PATENT OFFICE

LEONARD D. SOUBIER, OF TOLEDO, OHIO

MACHINE FOR FORMING HOLLOW GLASSWARE

Application filed June 13, 1928. Serial No. 284,908.

The present invention relates to improvements in machines for forming hollow glassware, such as bottles and jars, and more particularly to machines of the type wherein charges of molten glass are periodically gathered by suction molds from a supply body of molten glass.

An object of the invention is to provide a machine eliminating the necessity for using counterweights in manipulation of the charge gathering molds. To this end the gathering molds are arranged to oscillate about horizontal axes extending radially of the machine, said molds being actuated by cam mechanism whose periods of operation are controlled by rotation of a mold carriage.

Another object of the invention is to provide a machine including an annular series of charge gathering units which may be readily removed from the machine and replaced independently of each other. This feature is embodied in a construction such that releasing of a single locking device allows removal of a complete charge gathering unit.

A further object is to provide in a machine of the above character, a charge gathering unit in which the cutoff knife for severing the mold charges from the supply body and temporarily closing the cavity of the gathering mold is held stationary, and the severing operation effected by a vertical swinging movement of the charge gathering mold into operative relation to the cutoff.

A still further object is to provide novel means for adjusting the machine for the production of various types and sizes of glassware. To this end, the machine is constructed to permit telescopic adjustment of the sections of a sectional central supporting pillar for the machine, in a fashion to vary the vertical spaced relation between carriers for the ware shaping elements of the several mold groups or units. Thus molds of different heights may be used quite readily.

It is likewise an object to improve the previously employed methods of forming hollow glassware by a novel application of vacuum. To this end, the invention contemplates the raising of a mold charge of molten glass by suction into a mold adapted to shape the body of a parison exclusive of the neck, later moving a portion of said charge downwardly by suction into a member adapted to form the neck of the parison, and then completing the article by a series of blowing operations.

Other objects will be apparent hereinafter.

In the accompanying drawings:

Fig. 1 is a sectional elevation illustrating one head or mold group of my improved machine.

Fig. 2 is a transverse sectional view showing the charge gathering or body mold in charge gathering position.

Fig. 3 is a fragmentary sectional view, showing in detail the manner in which a portion of a charge of glass is drawn downwardly by suction into the neck mold to form the neck and initial blow opening.

Fig. 4 is a transverse sectional view in detail, showing the blow-up operation to form a complete parison, and the simultaneous application of final blowing air to expand a parison in the finishing mold.

Fig. 5 is a sectional elevation of a mold group, showing the charge gathering mold open and the parison which has just been formed therein, transferred to a finishing mold.

Fig. 6 is a detail sectional view illustrating the application of cooling air to the walls of the cavity in the gathering mold.

Fig. 7 is a fragmentary plan view of the machine showing one complete mold group, and the turnover unit and finishing mold unit of adjacent mold groups, and operating mechanisms for said groups.

Figs. 8, 9 and 10 illustrate more or less diagrammatically the several positions of one of the charge gathering molds over the supply body of molten glass, certain parts being omitted for the sake of clearness.

Fig. 8 shows the mold inclined to the vertical to clear the rim of the molten glass container.

Fig. 9 shows the mold returned to a vertical position for dipping into the glass.

Fig. 10 shows the mold inclined to the vertical to engage the lower end with the cutoff knife.

Fig. 11 is a detail illustrating the manner in which the hot glass sags and projects thru the lower end of the gathering mold upon return of the latter to a vertical position following severance of a charge from the supply body.

Fig. 12 is a similar view illustrating the manner in which the neck mold encloses said projecting portion of the glass just prior to formation of the neck.

Fig. 13 is a sectional elevation more or less diagrammatically showing the initial formation of the neck or finish, and body of the parison.

Fig. 14 is a view similar to Fig. 13, showing the parison completely formed.

Fig. 15 is also similar to Fig. 13, and shows the gathering mold sections separated to expose the parison which is inverted and supported by the neck mold.

Fig. 16 shows the parison swung to a pendent position and enclosed in the finishing mold.

Fig. 17 shows the parison expanded in the finishing mold.

Fig. 18 shows the finishing mold open and the finished article resting on a tilting bottom plate.

Fig. 19 is a diagrammatic illustration of the vacuum and air pipe lines for a single mold group.

According to the illustrated embodiment of the invention, the machine comprises a base 25 supporting a vertical central pillar 26, about which a mold carriage 38 carrying an annular series of mold groups, rotates in a horizontal plane. This pillar (Fig. 1) is composed of a plurality of superposed cylindrical sections, the upper pair telescoping one within the other and being relatively axially adjustable to provide for lengthening or shortening of the pillar to accommodate molds of various sizes and shapes, as may be required by the type of ware being produced. This feature will be described more in detail hereinafter.

The lower section 27 (Figs. 1 and 5) is formed with a series of annular chambers arranged in vertical spaced relation to each other, the lower one constituting a vacuum chamber 28, while the two chambers 29 and 30 arranged thereabove contain air under pressure for the mold groups, as will be apparent hereinafter. A vacuum pipe 31 and air supply pipes 32 and 33 (Fig. 1) communicate with the vacuum and compressed air chambers just referred to. These chambers 28, 29 and 30 communicate thru radial ports 34 with vacuum and compressed air chambers 35 and 36, respectively, formed in the base ring 37 of the rotary mold carriage 38. A driven ring gear 39 is secured the base ring 37 and rides upon an annular track 40 formed on the lower stationary section 27 of the central pillar 26.

The cylindrical sections 41 and 42 included in the central pillar 26 (Fig. 1) are secured together end on end and rigidly fixed as a unit to said lower section 27. Arranged within the lower section 41 is a stationary collar 43 in which the lower end of an adjusting rod 44 is threaded. This rod 44 extends axially of the pillar and at its upper end projects thru a collar 45 suitably connected to the upper section 46, the latter telescoping over the next lower or intermediate section 42, as previously stated. A thrust bearing 47 is arranged upon the adjusting rod 44 below the collar 45 and supports the upper section 46. Anti-friction balls 47ª are interposed between the bearing 47 and the collar 45. A worm gear 48 is secured to the adjusting rod 44 above the collar 45, and runs in mesh with a worm 49 on a horizontal shaft 50 (Figs. 1 and 7), the latter being manually rotatable by operation of a hand wheel 51 secured to said shaft. Rotation of the hand wheel 51 imparts a rotary movement thru said worm and gear to the adjusting rod 44, whereby the upper section 46 of the central pillar may be raised or lowered with respect to the sections therebelow. Thus, a blank mold carrier which is supported on said upper section 46 is hereinafter described, may be adjusted vertically relative to a turn-over unit arranged below said carrier, to permit use of various types and sizes of gathering molds.

The several mold units supported on the mold carriage 38 are identical in construction and operation, and accordingly the following description will, for the greater part, be confined more or less to one mold group or unit.

The mold carriage (Figs. 1 and 2) comprises upper and lower tables 55 and 56, respectively, interconnected by sectional telescopic posts 57 whose telescopic formation permits relative adjustment between the tables when the pillar sections are adjusted vertically. The lower table 56 (Fig. 1) may be, and in the present embodiment is formed integrally with the aforementioned base ring 37 of the mold carriage. A collar or ring 257 is formed on the upper table 55 and encircles the upper section 46 of the central pillar upon which the table is rotatively supported.

A radial flange 61 on the collar 257 is spaced by ball bearings 60 or the like anti-friction devices above a circular track 59 extending radially from the upper section 46 of the pillar. The upper table 55 is provided with an annular series of radial slideways 62, each mounting a slide 63 comprising part of a gathering mold carrier.

Each slide 63 is adjustable lengthwise in its supporting slideways to change the radial setting of a gathering mold 67 carried by the slide (Figs. 1 and 5) to thereby insure vertical alignment of said mold and the neck mold 175. Means (Figs. 1 and 7) to effect this adjustment and for releasably locking the mold carrying slide 63 against accidental movement in its supporting slideways, consists of an upstanding ear 63$^a$ at the forward end of the slide, said ear having a horizontally disposed adjusting screw 63$^b$ threaded therein; the latter carrying a pair of spaced collars 63$^c$. A lock bar 63$^d$ (Figs. 1 and 7) extends transversely over the slide and adjusting screw, and between said collars 63$^c$. This bar is hinged to one of the slideways 62 and releasably locked at its other end to the other slideway.

While the lock bar 63$^d$ is in engagement with the screw, the latter may be rotated to move the slide 63 and elements supported thereby lengthwise of the corresponding slideways or radially of the machine. When it is necessary to remove a gathering mold group from the machine as will appear later, the lock bar 63$^d$ is swung upwardly clear of the adjusting screw 63$^b$, whereupon the slide may be moved lengthwise in the slideways. Thus, gathering mold groups may be removed and replaced at will.

In constructing the gathering mold carrier (Figs. 1, 3 and 5), each slide 63 is formed with a depending web 64 extending lengthwise of the slide to provide connection between a pair of horizontally spaced bearings 65 and said slide, the axes of said bearings being parallel with the length of said slide. A sleeve 66 is journalled in these bearings 65 and supports at its outer end, a two-section partible gathering mold 67, the two sections of which are connected thru arms 68 to collars 69 encircling said sleeve 66. The sleeve 66 is free to rotate in the bearings 65 for a purpose hereinafter apparent. The gathering mold sections 67 (Fig. 3) are removably supported in carriers 70 so that the sections may be easily replaced when necessary. The upper end of the gathering mold (Fig. 3) is formed with an axial opening 71 and with an upstanding annular flange 72 whose inner wall 73 is tapered to engage a similarly tapered face of a shoulder 74 formed at the lower end of a closure plug holder "C". It is obvious that when the gathering mold sections close about the tapered shoulder 74, the closure plug 75 will be thereby properly positioned relative to the mold cavity 76.

This closure plug 75 (Fig. 3) is formed at the lower end of a tubular stem 77, having an externally threaded head 78 threaded into the lower end of a tubular section 79. A short tubular section 80 (Fig. 3) encloses and guides the tubular stem 77 and telescopes within said section 79. A coil spring 81 is interposed between opposed shoulders 82 on said sections 79 and 80 to thereby yieldingly support the closure plug 75 in its uppermost position. The tubular section 80 is suitably connected to a head 83 which, thru a sleeve extension 84, is connected to the outer end of the sleeve 66. This head 83 (Figs. 3 and 4) is formed with an annular chamber 85 communicating thru a radial port 86 with the stem 77, the axial passageway thru the latter having a series of radial openings 87 at its lower end extending thru the plug 75 and providing communication between said passageway and vacuum grooves 88 in the gathering mold 67. This circular chambered head 83 is in part supported by a tubular shaft 90 extending axially thru the sleeve 66 and projecting beyond opposite ends of the latter. A split collar 91 is secured to the outer end of the tubular shaft 90 to support a cut-off knife, as will be described presently.

This tubular shaft 90 (Figs. 1 and 3) has both ends closed by plugs 92 whereby a vacuum chamber is formed within said shaft. A vacuum control valve 93 (Fig. 3) is arranged within the tubular shaft 90 and is movable axially of the latter to alternately open and close radial ports 94 in the shaft 90 whereby communication between the interior of said shaft and the chamber 85 in the head 83 may be controlled. A valve stem 95 (Figs. 1 and 3) is connected to the valve 93 and extends axially of the shaft 90 and thru the plug 92 at the inner end of said shaft. A cam roll 96 is connected to said stem 95 and runs on a stationary cam 97 which is shaped to move the valve 93 at regular intervals and thereby open the ports 94 when the gathering mold 67 dips into a supply body of molten glass.

A coil spring 95$^a$ encircles a portion of said stem 95 and yieldingly engages the cam roll 96 with the cam 97. A pipe 98 (Fig. 1), arranged in part within the central pillar 26 provides means thru which vacuum may be applied to the interior of said tubular shaft 90 and thence to the gathering mold 67. One section of a telescopic pipe 99 communicates with the interior of the shaft 90 thru a radial port 100, while the other section communicates with an annular vacuum chamber 101 encircling the pillar 26 and communicating with the vacuum supply pipe 98 thru a radial port 102. This telescopic pipe construction is provided to allow ready removal of the gathering mold units.

A collar 103 (Figs 1 and 5) in which said port 100 is formed, is secured to the inner end of the tubular shaft 90, said collar having an upward extension 104 thereon, thru which it is rigidly attached to the slide 63. This extension 104 is formed with a pair of vertically spaced bearings 105 in which a shaft 106 is journalled. This shaft extends upwardly above the slide 63 and mounts rock arm 107 which carries a cam roll 108 running upon a stationary cam 109. The cam 109

(Figs. 1 and 7) is shaped to rock the arm 107 at regular intervals and thereby impart an oscillatory movement to the shaft 106. A gear segment 110 (Figs. 1 and 5) is fixed to the shaft 106 between the bearings 105 and runs in mesh with a gear segment 111 formed on a collar 112 secured to the sleeve 66 between the inner bearing 65 and said collar 103. Thru movement of these gear segments, oscillatory movement is imparted to the sleeve 66, gathering mold 67 and closure plug carrier "C", such movement being effected at regular intervals as the mold groups approach and leave the gathering station.

Mechanism for alternately opening and closing the gathering mold 67 (Fig. 1) comprises a pair of bell crank levers 115 fulcrumed on horizontal hinge pins 116 extending from opposite sides of the sleeve 66. One arm of each bell crank lever 115 is connected thru adjustable links 117 (Fig. 2) to the mold arms 68. A cross member 118 (Fig. 1) connects the other arms of the levers 115 and is formed with a depending finger 119 carrying a cam roll 120 running on a stationary cam 121. The cross member 118 is formed with a forward extension 122 supporting a coil spring 123 whose upper end bears against the sleeve 66 and normally yieldingly holds the gathering mold closed. The cam 121 operates to open the gathering molds at regular intervals.

The cut-off or shear mechanism (Figs. 1, 2 and 3) which severs charges of glass in the gathering mold from the supply body consists of a shear blade 125 or cut-off knife secured to the lower end of a shear arm 126 or cut-off arm which is fulcrumed at its upper end to a hinge pin 127 mounted on the outer end of an arm or bracket 128 the latter carried by one section of the split collar 91. A rock arm 129 (Figs. 1 and 2) is fulcrumed at its lower end to said hinge pin 127 between a pair of fingers 130 (Fig. 1) at the upper end of the shear arm 126, and is operatively connected to said shear arm thru a worm 132 carried by the rock arm, and a worm gear segment 133 formed on an extension at the upper end of the shear arm 126. This worm and gear device provides for adjustment of the angular relation between the rock arm 129 and shear arm 126 and consequent variation in the position of the shear blade relative to the mold. This latter feature is of importance in obtaining proper severance of the glass and closing the mold cavities.

A cam roll 135 (Figs. 1, 2 and 3) on the upper end of the rock arm 129 periodically engages the cam 136 on the head 83. In mounting the cam 136 which actuates the shear, a slide block 137 carrying said cam is arranged in a way or channel 139 extending longitudinally in the upper side of the head 83 and extension 84 on the latter. The cam 136 and slide block 137 are adapted for longitudinal movement in the slideway 139 at regular intervals to position the cam for engagement with the roll 135 when the gathering mold 67 swings vertically to operatively position the cut-off knife following gathering of a charge. This feature will be detailed hereinafter. The construction permitting such movement of the cam 136 comprises an upstanding finger 140 (Figs. 3 and 7) at the inner end of the slide block 137, said finger secured to one end of a rod 141 slidable in a guide or bearing 142 and having a roll 141$^a$ at its other end abutting a head 143$^a$ on the lower end of a lever 143. A coil spring 151 maintains engagement between the roll 141$^a$ and head 143$^a$ and normally yieldingly holds the cam 136 out of the path of the cam roll 135. The lever 143 is fulcrumed to a hinge pin 144 on the main slide 63 (Figs. 1 and 5) and is hinged to a rod 145 slidable radially of the machine in a bearing 146, said rod carrying a cam roll 147 running on a stationary cam 148.

This stationary cam 148 (Figs. 1, 5 and 7) is shaped so that immediately following the relative positioning of the gathering mold and cut-off knife shown in Fig. 10, it permits the spring 151 to expand and rock the lever 143, thereby moving the cam 136 radially inward. This cam movement permits a spring 150 (Fig. 2) to rock the arm 129 and shear arm 126 about the hinge pin 127 so that the shear blade 125 is lowered away from the bottom of the gathering mold 67. The mold 67 may then return to a vertical position without wiping the shear blade across the lower end of the charge of glass in the mold.

A turnover unit "T" (Figs. 1, 3, 4 and 5) is arranged in a plane below the gathering mold and carries means including a neck mold 175 co-operating at regular intervals with the gathering mold to form parisons which are later transferred, by inversion of the turnover unit, to a finishing mold for expansion to their final shapes. This turnover unit (Figs. 1, 3 and 4) comprises an air motor 160 formed with opposed trunnions 161 having axially aligned openings therethru receiving the inner end portions of supporting stub shafts 162 journalled in bearings 163 formed on the outer ends of arms 164 (Fig. 1). These arms 164 extend outwardly from a frame 165 spaced above the base portion 56 of the mold carriage and are connected to a slide 232 on the latter by standards 166. This structure supports the turnover unit "T" so that it may be inverted and reinverted in alternation at regular intervals by means of a cam actuated rack and pinion mechanism including a pinion 167 secured to one of the trunnions 161 (Fig. 4), a rack bar 168 running in mesh with said pinion, and a slide 169 (Fig. 1) running in a slideway 170 on said frame 165 and carrying a cam roll 171 at its inner end, said rack bar being actuated at regular intervals by engagement of the roll 171 with a stationary cam 172 on the pillar 26.

A partible neck mold 175 is mounted on the upper end of the air motor 160 (Figs. 1, 3 and 4), said neck mold comprising a pair of sections or mold halves fulcrumed to a vertical hinge pin 176 about which they swing during opening and closing movements.

A differential piston 178 (Figs. 3 and 4) carries a plunger 179 at its upper end designed to co-operate with the neck mold cavity 177 in the formation of the finish or neck portion of the bottles or other articles, and to form an initial blow opening 180 extending into one end of the charge of glass in the gathering mold. Compressed air is continuously applied to the upper side of the differential piston 178 thru a supply pipe 181 (Figs. 4 and 19) and a passageway 182 extending longitudinally thru one of the shafts 162, said passageway opening at its inner end into a chamber 183 which in turn communicates with an annular chamber above the piston 178. The pipe 181 communicates thru a sectional telescopic pipe 184 (Figs. 5 and 19) with the upper compressed air supply chamber 36 in the base ring 37 of the mold carriage. A branch pipe 185 (Fig. 19) extends radially inward from a connection 186 between the pipes 181 and 184 and communicates thru upper and lower pipe sections 187 and 188, with intermediate and lower chambers 189 and 214 respectively, of a valve box 191. Thus, air under pressure is constantly supplied to said chambers 189 and 214 for application to the turnover unit as will be evident presently.

A branch pipe 192 provides communication between the chamber 189 of the valve box and a longitudinal passageway 193 (Fig. 4) extending thru one of the shafts 162, said passageway being formed with a radial port 194 which registers at times with a conduit 195 extending longitudinally of the air motor cylinder wall. This conduit 195 is provided with a lateral opening 196 at its upper end whereby, when the turnover unit is in an upright position, communication is established between the interior of the neck mold and the pipe 192.

A vacuum pipe 197 (Fig. 19) is connected at one end to an intermediate portion of said pipe 192 and at its other end to a vacuum chamber 198 in the upper end of the valve box 191. Valves (not shown) are arranged in the vacuum and compressed air chambers 198 and 189, respectively, to control the application of air pressure and vacuum to the neck mold cavity. The vacuum and air pressure control valves are provided with stems 199 and 200, respectively, contacting with vacuum and compressed air control cams 201 and 202, respectively. These valves 201 and 202, are actuated one at a time in the order referred to, while the turnover unit is in the position shown in Fig. 4, so that vacuum is first applied to the neck mold cavity to fill the latter with glass drawn downwardly from the gathering mold 67, after which air under pressure is applied in the form of a short puff to form the initial blow opening 180 in the parison. Air under pressure is supplied to an intermediate chamber 203 in the valve box 191 thru a pipe 204 from the lower compressed air supply chamber 36 in the mold carriage base ring. A branch pipe 205 leads from the intermediate chamber 203 (Fig. 19) to a conduit 206 extending lengthwise thru one of the stub shafts 162, said conduit leading to a chamber 207 beneath the differential piston 178. A valve (not shown) including a stem 208 (Figs. 1 and 5) is arranged in the intermediate chamber 203, said stem contacting with a stationary cam 209 by which the valve is actuated at regular intervals. This last named valve is actuated just prior to opening of the vacuum and compressed air control valves previously described, so that air under pressure is applied to the lower side of the differential piston to raise the latter and project the plunger 179 upwardly into the neck mold 175, such projection causing the tip to penetrate the downwardly projecting portion 210 of the glass which has just been gathered into the mold 67 (see Figs. 4, 11 and 12).

The vacuum chamber 198 in the valve box 191 communicates thru a pipe 212 with the vacuum chamber 35 in the mold carriage base ring.

Final blowing air is applied to the finishing mold 225 thru a branch pipe 213 (Fig. 19) from the lower chamber 214 of the valve box 191 to a longitudinal conduit 215 extending thru one of the stub shafts 162 (Fig. 4), said conduit being substantially L-shaped and communicating at times thru a series of passageways 216 with an annular recess 217 in which a blowing sleeve 218 is slidably mounted. A valve (not shown) having a valve stem 214ª thereon controls the passage of air thru the chamber 214, said valve stem engaging a stationary cam 215ª which actuates said valve. The blowing sleeve is formed with a differential sleeve piston 219 at its upper end. The piston 219 is normally held at the upper end of the annular chamber 217 by the constant application of air under pressure thru a conduit 220, the latter leading to the lower end of said annular chamber from the chamber 183 adjacent the upper end of the motor. When the blowing sleeve 218 (Fig. 4) is lowered, the differential piston 219 uncovers a port 221 leading to an angular passageway 222. Thus, air under pressure is applied to the interior of the blowing sleeve 218 and thence to the expanded parison enclosed in the finishing mold 225. A spring pressed detent 226 (Fig. 4) is alternately seated in diametrically opposed recesses 227 in one of the stub shafts 162 whereby the turnover unit "T" is yieldingly held against accidental movement.

The finishing mold 225 (Figs. 4, 5 and 7) comprises a pair of co-operating sections carried by mold arms 230 fulcrumed upon a vertical hinge pin 231 rising from the aforementioned slide 232 on the lower table 56 of the mold carriage.

An auxiliary slide 233 (Fig. 7) is movable longitudinally upon the slide 232 and is connected thru links 234 to the mold arms 230. This auxiliary slide 233 carries a cam roll 235 running on a stationary cam 236, the latter shaped to move the slide radially at regular intervals to alternately open and close the finishing mold. The main slide 232 carries a cam roll 237 at its inner end running in a stationary cam 238 shaped to periodically move the finishing mold 225, turnover unit "T" and neck mold 175 radially outward on the mold carriage into vertical alignment with the gathering mold 67.

A bottom plate 239 (Fig. 1) is connected thru a rock arm 240 to a hinge pin 241 on the main slide 232 and carries a cam roll 242 running on a stationary track 243, the latter shaped to rock the arm 240 at regular intervals whereby the mold bottom 239 tilts to a position for ejecting ware from the mold.

In describing the operation of the machine reference will be made to a single mold group since the cycles of operations of the several groups are identical. As a mold approaches the supply body of molten glass the lever 107 (Figs. 1 and 7) is rocked by cam 109 so that the meshing gear segments 110 and 111 are oscillated. Movement of the gear segment 111 in one direction swings the gathering mold unit to the position shown in Fig. 8 whereby the lower end of the mold 67 clears the rim of the tank 300 containing the supply body of molten glass.

After the gathering mold has passed inwardly beyond the rim of the tank the lever 107 is again rocked by the cam 109 to impart a rotary movement to the gathering mold carrier whereby said mold is returned to a pendent position in which its lower end dips into the body of molten glass. While the mold is in this position the slide valve 93 is moved radially outward by the cam 97 to the position shown in Fig. 3 to thereby bring the ports 94 into register with each other and permit application of vacuum to the cavity in the gathering mold 67. Thus, a charge of molten glass is raised into the gathering mold substantially as shown in Fig. 2.

During this charge gathering operation the mold is moving in a horizontal plane toward the opposite side of the tank. Just prior to reaching the rim at said opposite side of the tank, the lever 107 heretofore referred to is rocked in a direction to swing the gathering mold 67 in the direction opposite to that in which it was moved prior to arrival at a position over the glass. This raises the lower end of the mold to a plane in which it will clear said rim of the tank. Just before this last swinging movement is started a cam 148 (Fig. 1) rocks the lever 143 to project the cam 136 (Fig. 3) radially outward to a position in the path of travel of the cam roll 135 so that while the gathering mold 67 is swinging toward the position shown in Fig. 10, said cam rocks the cutoff arm 126 about hinge pin 127.

This rocking movement of the cutoff arm moves the knife inward toward the path of the mold so that the mold, during its final swinging movement, is brought into contact with the knife, whereby the charge of glass in the mold is severed from the supply body and the bottom of the mold cavity closed for a short period of time. After the mold 67 passes beyond the rim of the tank, the cam 136 (Figs. 1, 3 and 7) is retracted and permits the coil spring 150 to rock the cutoff arm 126 and move the shear blade 125 downwardly away from the mold 67. After the cutoff knife 125 has been removed from contact with the mold, the latter is returned to its vertical position as shown in Figs. 4 and 11.

Immediately after the gathering mold 67 has passed beyond the tank, the turnover unit "T" and finishing mold 225 are moved radially outward with the slide 232 (Fig. 1) to a position in which the neck mold 175 is below and in register with the gathering mold 67, substantially as shown in Fig. 12. The unsupported lower portion of the glass in the mold cavity sags and projects into the neck mold 175 just prior to projection of the plunger tip 179 into the neck and gathering mold cavities.

Air under pressure is applied thru the pipe 205 (Figs. 4 and 19) to the lower side of the differential piston 178 to thereby project the plunger tip 179 upwardly into the lower portion of the mold charge. Substantially simultaneously with completion of the upward movement of the plunger tip 179, vacuum is applied to the neck mold cavity to draw a portion of the glass downwardly into said cavity and form the neck, or finish, of the article.

This application of vacuum moves the mold charge downwardly away from the upper end of the gathering mold 67 (Fig. 13). Immediately following the application of vacuum, which together with a pressing operation by the plunger, forms said neck, the plunger tip 179 is lowered away from the glass and a short puff of compressed air is applied to the opening formed by said plunger tip 179 to thereby create an initial blow opening 180 in the lower end of the mold charge.

The lowering of the plunger tip 179 is effected by shutting off the application of compressed air to the lower end of the differential piston 178. The short puff of compressed air is applied thru the pipe 192 and conduit 195 (Fig. 4). Thus a parison is formed in the gathering and neck molds, and is ready for transfer to the finishing mold 225.

While the parison occupies the position shown in Fig. 4, the gathering mold 67 is opened so that the parison is free to swing downwardly to a position for enclosure in the finishing mold 225. The gathering mold 67, as previously stated, comprises two half sections movable into and out of co-operative relation to each other by a pair of bell crank levers 115. These levers, at this stage of operations, are rocked by the cam 121 (Figs. 1 and 5) so that the mold sections are separated as shown in Fig. 15. The turnover unit "T", including the neck mold 175, which is now supporting the parison, is inverted to permit enclosing the parison in the finishing mold 225.

By moving the rack bar 168 radially outward, rotary movement is imparted to the pinion 167, and the turnover unit is thereby inverted and positioned, substantially as shown in Fig. 16. Immediately upon the completion of the inversion of the turnover unit the cam 236 (Fig. 5) operates to close the finishing mold 225 about the parison which is now suspended from the neck mold 175. After the finishing mold 225 has completely closed about the parison, compressed air is applied thru the pipe 213 and conduits 215 and 195 to the finishing mold, it being understood that with inversion of the turnover unit, the conduit 195 has been brought into register with conduit 215. This compressed air is applied to the initial blow opening 180 and expands the parison to its final shape in the finishing mold.

While the parison is being expanded by the application of compressed air thru the neck mold 175, compressed air is directed upwardly thru the conduit 222 (Fig. 6) into the gathering mold cavity. Thus, the walls of this cavity are cooled prior to gathering another charge of glass.

After the parison has been expanded as just stated, the neck mold 175 is opened by any conventional or preferred type of mechanism (not shown) and the rack bar 168 is moved radially inward to reinvert the turnover unit "T". The sleeve 218 (Figs. 4, 17 and 18) is now moved downwardly into engagement with the upper end of the finishing mold 225 by the sleeve piston 219 so that it encloses the neck or finish which projects a short distance above the finishing mold.

When the sleeve 218 reaches its lowermost limit, it automatically opens communication between the conduits 215, 221 and 222 thru which additional compressed air flows to the interior of the expanded parison. Thus air pressure is maintained within the article until complete setting of the glass is obtained and likelihood of the article collapsing after removal from the mold is almost entirely eliminated.

While this secondary blowing operation is taking place, another parison is being formed in the gathering mold in the manner described above.

At a predetermined station, application of compressed air to the upper end of the sleeve piston 219 is discontinued so that said sleeve automatically moves upwardly away from the finishing mold and shuts off the supply of air to the sleeve. The finishing mold then opens and the bottom plate 239 supporting the expanded parison tilts downwardly to eject the finished article from the mold.

Modifications may be resorted to within the spirit and scope of the appended claims.

What I claim is:

1. In combination, a suction gathering mold mounted in permanently inverted position and open at its lower end to receive a charge of glass, means for drawing a charge of glass upward by suction from a supply body into said mold through the lower end thereof, a finishing mold therebelow, a turnover unit interposed between said molds, a neck mold on the turnover unit, means to form a parison in the gathering and neck molds, means to invert the turnover unit to transfer a parison to the finishing mold, and means to expand the parison to its final form in said finishing mold.

2. In combination, a suction gathering mold, a turnover unit arranged in a plane below said mold, a neck mold carried by the turnover unit, suction means to gather a charge of glass into said gathering mold, means to cause a relative movement between said molds in a horizontal plane to bring them into register with each other, and suction means to move the glass longitudinally in the gathering mold and fill the neck mold.

3. In combination, a suction gathering mold, a turnover unit arranged in a plane below said mold, a neck mold carried by the turnover unit, suction means to gather a charge of glass into said gathering mold, means to cause a relative movement between said molds in a horizontal plane to bring them into register with each other, suction means to move the glass longitudinally in the gathering mold and fill the neck mold, and means to apply air pressure thru the neck mold to completely form a parison in said molds.

4. In combination, a rotary mold carriage, a suction gathering mold thereon, a turnover unit on the mold carriage in a plane below said gathering mold, a neck mold on the turnover unit, a finishing mold on said carriage, means to move the turnover unit and finishing mold radially of the mold carriage to align the neck and gathering molds, means to completely form a parison in said aligned gathering and neck molds, and means to invert the turnover unit to transfer a completely formed parison to the finishing mold for transformation into a finished article.

5. In combination, a rotary mold carriage, an annular series of radially extending slideways formed on the mold carriage, an annular series of slides individual to said slideways and movable radially of the carriage in said slideways, partible suction gathering molds suspended from the slides, mold opening and closing mechanism carried in part by said slides, and locking devices individual to the slides and each releasably securing the corresponding slide in its slideway and preventing sliding movement of the slide while the mold carriage is rotating.

6. In combination, a rotary mold carriage, an annular series of radially extending slideways formed on the mold carriage, slides movable radially of the carriage in said slideways, means for locking the slides and preventing radial movement during the rotation of the mold carriage, partible suction gathering molds suspended from the slides, mold opening and closing mechanism carried in part by said slides, and manually controlled means for adjusting the slides in said slideways to change the radial setting of the molds.

7. The combination with a container for a supply body of molten glass, of a machine for forming glass articles comprising a mold carriage, means for rotating the carriage, an annular series of suction gathering molds supported on the carriage with their lower ends open for receiving charges of glass, said carriage and molds being so arranged relative to the container that the molds are brought by the rotation of the carriage in succession to a gathering position over the supply body of molten glass, mechanism for swinging each of the molds in succession while over said container, in a vertical plane which is tangent to its path of travel with the mold carriage and causing its charge receiving end to move relative to the mold carriage in a direction opposite to the direction in which that part of the mold carriage is traveling to which the mold is attached, and means for drawing a charge of glass by suction from the supply body into the mold during said swinging of the mold.

8. In combination, a suction gathering mold, a turnover unit therebelow, a neck mold on the turnover unit, a finishing mold below said unit, means to simultaneously move the turnover unit and finishing mold radially of the mold carriage alternately into and out of vertical alignment with the gathering mold, and manually controlled means for effecting relative radial adjustment between the neck mold and gathering mold.

9. In combination, a blank mold open at its lower end, an upwardly opening neck mold, suction means to gather glass into the blank mold thru said open lower end, means to bring the open ends of said molds into cooperative relation to each other at regular intervals, and means to move portions of the glass thru the open ends of the molds to fill the neck mold.

10. In combination, a blank mold open at its lower end, an upwardly opening neck mold, suction means to gather glass into the blank mold thru said open lower end, means to bring the open ends of said molds into cooperative relation to each other at regular intervals, and suction means to move portions of the glass thru the open ends of the molds to fill the neck mold.

11. In a glassware forming machine, the combination of a rotary mold carriage, an annular series of radial slideways on the carriage, an annular series of slides individual to said slideways, a blank mold suspended from each slide, means for adjusting the slides radially of the machine in said slideways to vary the radial setting of the blank molds, and means to prevent movement of the slides in their slideways during the rotation of the mold carriage.

12. In a glassware forming machine, the combination of a rotary mold carriage, an annular series of radial slideways on the carriage, slides in said slideways, a blank mold suspended from each slide and rotating with the mold carriage in a circular closed path concentric with the axis of rotation of the carriage, and means for individually adjusting the slides radially of the machine to vary the radial settings of the blank molds.

13. In a glassware forming machine, the combination of a rotary mold carriage, an annular series of radial slideways on the carriage, slides in said slideways, means for adjusting the slides along the slideways, a blank mold suspended from each slide and rotating with the mold carriage in a circular closed path concentric with the axis of rotation of the carriage, and means for releasably securing the slides in the slideways, whereby the slides and mechanism suspended therefrom may be individually removed from the mold carriage.

14. In a glassware forming machine, the combination of a rotary mold carriage, an annular series of radial slideways on the carriage, slides in said slideways, means for adjusting the slides along the slideways, a blank mold suspended from each slide and rotating with the mold carriage in a circular closed path concentric with the axis of rotation of the carriage, means whereby the slides and mechanism suspended therefrom may be individually removed from the mold carriage, and a locking device for each slide, said device being in part formed by the slide adjusting means.

15. In a glassware forming machine, the combination of a stationary central pillar, a mold carriage rotatively mounted thereon, a suction gathering mold having an open lower end thru which charges of glass are periodically drawn into the mold cavity, a neck mold arranged in a plane below the gathering mold, suction means operating at regular intervals to move portions of glass from the gathering mold into the neck mold, a carrier for the gathering mold, and means to change the vertical spaced relation between the gathering mold carrier and neck mold whereby gathering molds of different sizes may be employed.

16. In a glassware forming machine, the combination of a suction gathering mold, a suction neck mold below and separate from the gathering mold, means operating at regular intervals to bring the molds into register with each other, and suction means to move a charge of glass longitudinally downward in the gathering mold to fill the neck mold cavity.

17. In a glassware forming machine, the combination of a suction gathering mold having an open lower end, a finishing mold arranged in a plane below said gathering mold, a turnover unit and neck mold arranged between the gathering and finishing molds, means to move the finishing mold and turnover unit radially outward at regular intervals to bring the neck and gathering molds into vertical alignment, means to form a parison in the neck and gathering molds, and means to invert the turnover unit and neck mold to transfer the formed parison to the finishing mold.

18. In a glassware forming machine, the combination of a rotary mold carriage, a slide movable radially thereon, a suction gathering mold oscillatively suspended from said slide, a neck mold mounted separately from said slide in a plane below the gathering mold, means to adjust the slide radially of the carriage to vary the horizontal spaced relation between the gathering and neck molds, means to introduce a charge of glass by suction into the gathering mold independently of the neck mold, and means for then bringing said molds into register.

19. In a glassware forming machine, the combination of a rotary mold carriage, a slide movable radially thereon, a suction gathering mold oscillatively suspended from said slide, a neck mold mounted separately from said slide in a plane below the gathering mold, a single releasable locking device securing the slide to the mold carriage to thereby hold the gathering mold against radial movement, means to introduce a charge of glass by suction into the gathering mold independently of the neck mold, and means for then bringing said molds into register.

20. In a glassware forming machine, the combination of a rotary mold carriage, an annular series of radial slideways thereon, slides in said slideways, radially aligned bearings suspended from said slides, sleeves extending thru said bearings, and suction gathering molds secured to the sleeves and formed with open lower ends thru which charges of glass are periodically gathered.

21. In a glassware forming machine, the combination of a rotary mold carriage, an annular series of radial slideways thereon, slides in said slideways, radially aligned bearings suspended from said slides, sleeves extending thru said bearings, suction gathering molds secured to the sleeves and formed with open lower ends thru which charges of glass are periodically gathered, and mechanism to oscillate the sleeves at regular intervals to thereby swing the molds alternately into and out of a charge gathering plane.

22. In a glassware forming machine, the combination of a rotary mold carriage, an annular series of radial slideways thereon, slides in said slideways, radially aligned bearings suspended from said slides, sleeves extending thru said bearings, suction gathering molds secured to the sleeves and formed with open lower ends thru which charges of glass are periodically gathered, and mechanism to oscillate the sleeves at regular intervals to thereby swing the molds alternately into and out of a charge gathering plane, said last named means comprising cam actuated gear mechanism in part carried by the sleeves.

23. In a glassware forming machine, a suction gathering mold movable at regular intervals in a closed path past a charge gathering station, means to swing the mold about a horizontal axis in the direction of the path of travel of the mold to alternately move the mold into and out of a charge gathering plane, means to apply vacuum to the mold while the latter is at the charge gathering station, a cut-off knife brought into charge severing engagement with the mold bottom by a swinging movement of said mold, and automatic means to move the cut-off knife downwardly away from the mold after the severing operation.

24. In a glassware forming machine, a suction gathering mold movable at regular intervals in a closed path past a charge gathering station, means to swing the mold about a horizontal axis in the direction of the path of travel of the mold to alternately move the mold into and out of a charge gathering plane, means to apply vacuum to the mold while the latter is at the charge gathering station, a cut-off knife brought into charge severing engagement with the mold bottom by a swinging movement of said mold, automatic means to move the cut-off knife downwardly away from the mold after the severing operation, said automatic means comprising a rock arm, connected to the cut-off knife, and cam mechanism periodically rocking said arm.

25. In a glassware forming machine, the combination of a suction gathering mold, a cut-off knife at one side of the mold, mechanism to move the mold relative to said knife to sever a charge of glass in the mold from a supply body of glass, and cam means to move the knife downwardly away from the mold.

26. The method which consists in raising a mass of molten glass by suction into a mold, applying suction to the lower end of the mass of glass to move portions thereof downwardly into a neck mold, and applying air under pressure to the lower end of the mass of glass to form an initial blow opening and complete a parison.

27. The method which consists in raising a mass of molten glass by suction into a mold, applying suction to the lower end of the mass of glass to move portions thereof downwardly into a neck mold, applying air under pressure to the lower end of the mass of glass to form an initial blow opening and complete a parison, and then applying air under pressure thru the blow opening to expand the parison.

28. The method which consists in raising a mass of molten glass by suction into a mold, applying suction to the lower end of the mass of glass to move portions thereof downwardly into a neck mold, applying air under pressure to the lower end of the mass of glass to form an initial blow opening and complete a parison, inverting the parison, and applying air under pressure thru the blow opening to expand the parison.

29. In a machine for forming glass articles, the combination of a mold carriage, a suction gathering mold thereon, a mold closing plate on the carriage at one side of the mold, said plate having a knife edge, means for introducing a charge of glass by suction into the mold, mechanism to move the mold on the carriage and cause the charge receiving end thereof to wipe across the knife edge to sever the glass and bring the mold to a position in which it is closed by said plate, and means to then move said plate away from the mold in a direction transverse to the plane of said plate.

30. In a machine for forming glass articles, the combination of a mold carriage, a mold thereon open at one end to receive a charge of glass, a knife plate mounted on the mold carriage, means for bringing said open end of the mold into association with a supply body of molten glass and introducing a charge of glass into the mold by suction, means for moving the mold on the carriage and thereby causing said open end to wipe across the knife plate and sever the charge of glass from the supply body and bring the knife plate into position to close said end of the mold, and means for then separating the knife plate and mold by a relative movement in a direction perpendicular to the plane of said plate.

31. In apparatus for forming hollow glass articles, the combination of a body mold and a neck mold, means for causing a periodic relative movement of the molds into and out of a position in which the neck mold is below and in register with the body mold, means for introducing molten glass into one of said molds while the molds are out of register and causing it to conform to the shape of the mold, and means for then expanding the glass in the other mold after the molds are brought into register.

32. In glass forming apparatus, the combination of an inverted neck mold, an inverted body mold above the neck mold, each of said molds comprising separable sections for opening and closing the molds, means for effecting a relative movement of the molds into and out of a position in which the molds are closed and in register, means for shaping the glass in one of said molds while the sections of the other mold are separated, and means for shaping the glass in the other mold while the molds are closed and in register.

33. In apparatus for forming hollow glass articles, the combination of an inverted body mold, an inverted sectional neck mold below and in register with the body mold, means for separating the neck mold sections and thereby withdrawing them away from the body mold, means for introducing a charge of molten glass into the inverted body mold while the neck mold sections are separated and out of register with the body mold, means for then closing the neck mold sections and bringing the neck mold into register with the body mold, and means for then applying suction to the closed neck mold and thereby drawing a portion of the charge of glass from the body mold into the neck mold and shaping it in the neck mold.

34. The method of forming a hollow glass article which consists in introducing a charge of glass into a mold, thereafter bringing a second mold into register with the lower open end of the first mold, causing a downward movement of glass from the first into the second mold, applying suction in said second mold to shape the glass therein, and expanding the glass by air pressure within the molds.

35. The method of drawing a hollow glass article which consists in introducing a charge of glass into a mold, thereafter bringing a second mold into register with the lower open end of the first mold, causing a downward movement of glass from the first into the lower second mold, shaping the glass in the lower mold by differential pressure applied at opposite ends of the glass in the molds, and expanding the glass in the molds by air pressure applied to the interior of the mass of glass in the molds.

36. The combination of a body mold comprising separable sections, and formed with a vertically disposed mold cavity, a neck mold beneath and in register with the body mold, said neck mold having horizontally separable sections, and means for swinging the sections of the body mold about a horizontal axis positioned above the mold and thereby opening said body mold while the neck mold is in said position beneath the body mold.

Signed at Toledo, in the county of Lucas and State of Ohio, this 11th day of June, 1928.

LEONARD D. SOUBIER.